US005671520A

United States Patent [19]

Scarborough

[11] Patent Number: 5,671,520

[45] Date of Patent: Sep. 30, 1997

[54] COMBINATION TOOL FOR QUICK TUBE JOINT DISASSEMBLY

[75] Inventor: Don R. Scarborough, Piedmont, S.C.

[73] Assignee: Patent Consultants & Services, Inc., Greenville, S.C.

[21] Appl. No.: 391,790

[22] Filed: Feb. 21, 1995

[51] Int. Cl.[6] .......... F16L 35/00

[52] U.S. Cl. .......... 29/237; 29/268

[58] Field of Search .......... 81/3.4, 3.44; 29/237, 29/267, 268, 238, 239

[56] References Cited

U.S. PATENT DOCUMENTS

| | | | |
|---|---|---|---|
| 650,186 | 5/1900 | Maxson | 29/268 |
| 3,308,692 | 3/1967 | Sato . | |
| 3,414,961 | 12/1968 | Bjalme | 29/237 |
| 3,654,686 | 4/1972 | McFarland et al. . | |
| 3,727,490 | 4/1973 | Diffenderfer et al. . | |
| 4,009,515 | 3/1977 | Racin . | |
| 4,257,135 | 3/1981 | Moebius | 29/268 |
| 4,519,122 | 5/1985 | Miller | 29/237 |
| 4,738,017 | 4/1988 | Teramo | 29/268 |
| 4,757,588 | 7/1988 | Churchich | 29/268 |
| 4,893,393 | 1/1990 | Marshall | 29/237 |
| 5,084,954 | 2/1992 | Klinger | 29/237 |
| 5,226,230 | 7/1993 | Klinger | 29/237 |
| 5,245,721 | 9/1993 | Lowe et al. . | |

*Primary Examiner*—Robert C. Watson
*Attorney, Agent, or Firm*—Cort Flint; Robert R. Reed

[57] ABSTRACT

The disassembly of conduit fittings in vehicular sub-systems becomes very difficult and time consuming as a result of their location and the effect of corrosion. Various fittings have been designed to make this maintenance task less work for the mechanic. However, special tools must frequently be designed to provide for the hard to access locations and frozen joints that frequently exist. The combination tool of this invention provides such a tool for a common conduit fitting used in fluid piping sub-systems of vehicles. In particular, the air conditioning systems of automobiles can have a number of these fittings. The combination tool of this invention has three handles. Two of the handles, along with a jaw and collar fixture for each handle, form pliers to grip one female connector portion of the fitting. A collar portion of the jaw and collar fixture also displaces a retainer spring in a connector flange of the conduit fitting. A third handle is rotatably attached to the other two handles and has a retainer fixture attached. This third handle retains the connector flange of the conduit fitting. By a sequence of relative positions of the three handles the conduit fitting can be easily disassembled. The three fixtures can be replaced with identical fixtures of a different size to allow for different conduit fitting sizes. The combination tool of this invention can reduce the time to disassemble a conduit fitting from more than an hour to less than five minutes.

9 Claims, 8 Drawing Sheets

Fig. 11
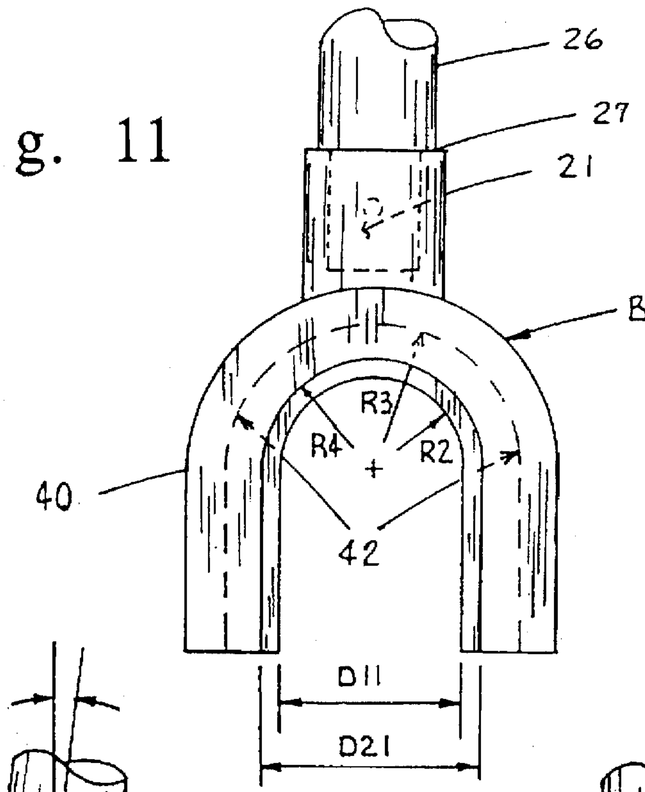
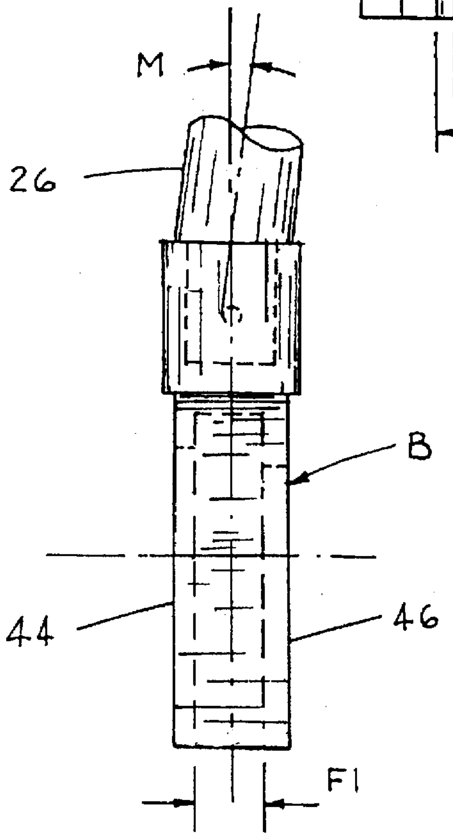
Fig. 12
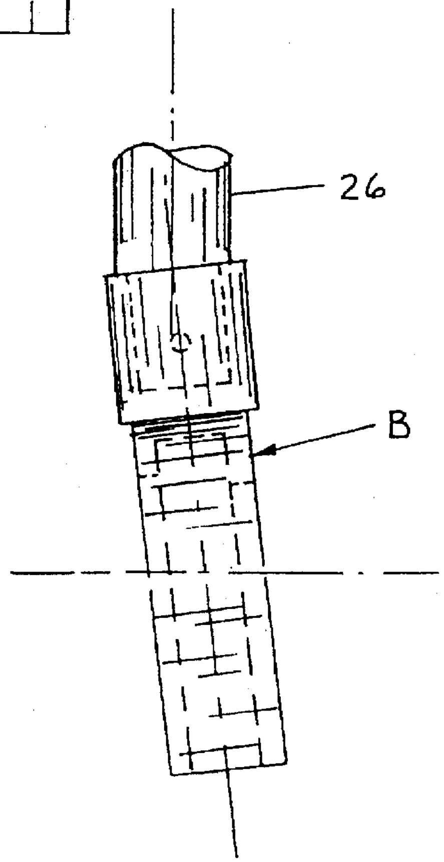
Fig. 13

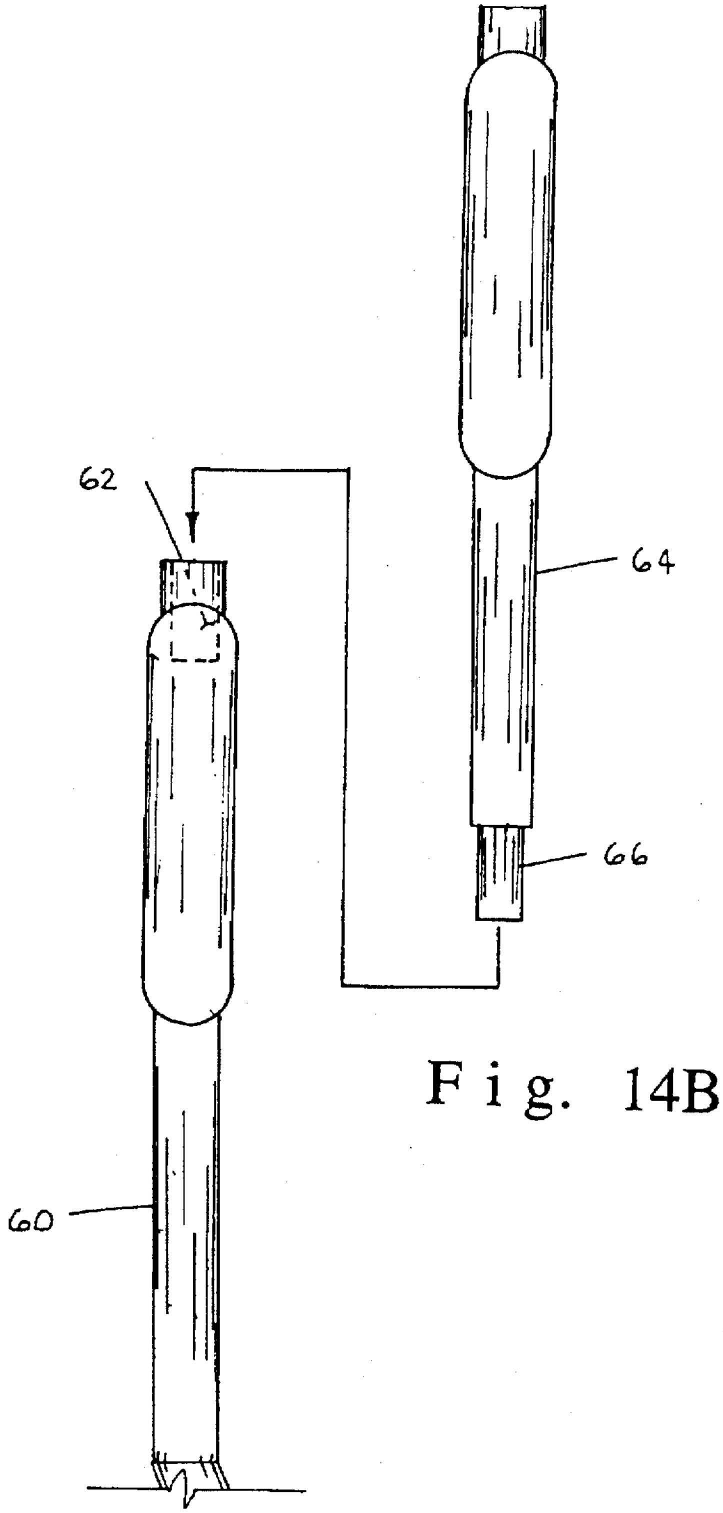
Fig. 14B
Fig. 14A
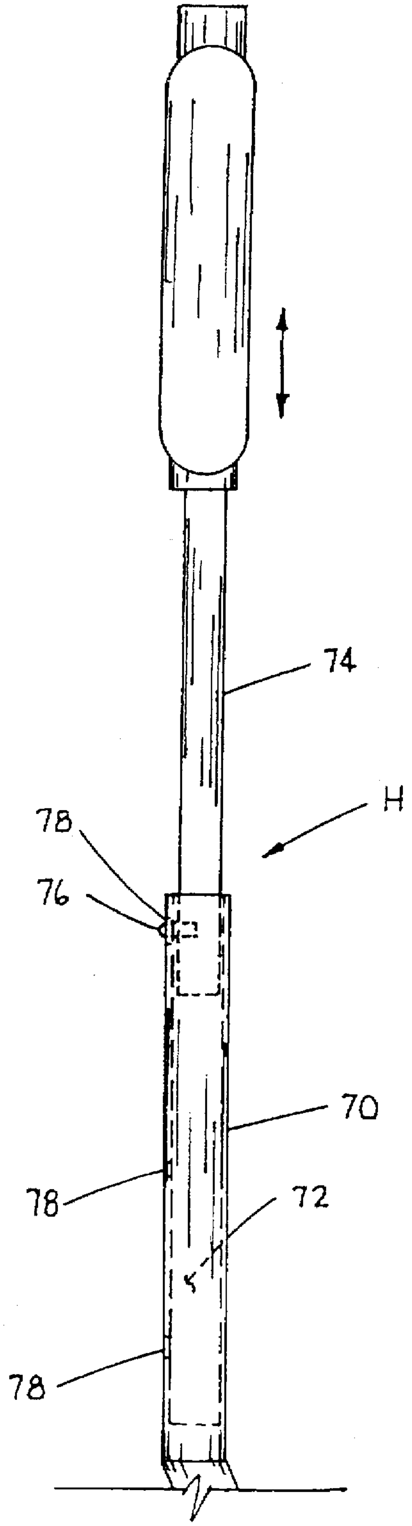
Fig. 15

COMBINATION TOOL FOR QUICK TUBE JOINT DISASSEMBLY

BACKGROUND OF THE INVENTION

The technical field of this invention is that concerning hand held tools for working on pipe joints or tubular couplings. In particular the invention relates to a single combination tool for a tubular conduit fitting which provides a plurality of pushing and pulling operations to disconnect the joint.

Numerous mechanical components are assembled at the factory with little regard for their ability to be maintained during use. The economy in assembling these components has a large influence on the location of various sub-components. The need to access these sub-components on a regular basis has not been given proper consideration. The initial cost of manufacture has dominated the configuration of the final product. In addition, the ability to design special tools in the factory to accomplish special tasks for a large number of units is cost effective. This is not the same when working on a relatively limited number of units. Furthermore, the design of the tool frequently can not be the same when the unit is in service. This is particularly true in the automotive industry where sub-components are frequently not accessible. Automobile maintenance is further complicated by working around a hot engine as well as working on components which have been damaged by use and corrosion. Numerous tools have been designed to work on sub-components of the automobile, and other similar articles of manufacture, that are tools not required to initially produce the article.

Frequently a low cost tool can be designed to fit the needs of the mechanic. Examples of hand held tools for the auto mechanic are those described in U.S. Pat. Nos. 3,654,686; 3,727,490; and 4,009,515. In U.S. Pat. No. 3,654,686 a hand held tool has jaws for reaching into automobile engines and gripping machine parts to remove them for maintenance or replacement of the part. The purpose of this elongated tool is for removal of valve lifters and tappets. The purpose of the hand held tool of U.S. Pat. No. 3,727,490 is to spread the disk brake pads of the brakes of an automobile to allow removal and placement of the shoes over a rotor. The tool has two or more X-shaped linkages and a drive screw to cam the linkage legs apart and provide a spreading force to the shoes. An automobile disk brake piston puller is disclosed in U.S. Pat. No. 4,009,515. This tool is for manually releasing a frozen brake piston from a cylindrical cavity. The piston may be frozen as a result of corrosion from the fluids within the break system. These various hand held tools are typical devices used to solve the problems associated with the general maintenance of automobiles, trucks, construction equipment and other vehicles of the like.

An automobile sub-system which has become more difficult to maintain is the air conditioning system. In particular, the fittings of the tubular conduits that transmit the fluids of the system have become more difficult to disconnect and remove for replacement and/or repair. The auto mechanic must allow as much as two hours to disconnect a single joint depending on its location. This is the result of the type of tube fitting use as a connector in recent years. The fitting is illustrated in FIG. 1 of the drawings of this application. This fitting has also been used for conduiting other fluids in a vehicle including conduit lines of fuel sub-systems. Details of this fitting are disclosed further in these specifications.

Hand held tools often use the gripping action of jaws to hold and apply forces to the component being worked upon. The force on the jaws to hold the component is usually applied in the form of pliers having handles which are gripped and pulled together. Two examples of this are illustrated in U.S. Pat. No. 3,308,692 and more recently in U.S. Pat. No. 5,245,721. The plier-type tool of U.S. Pat. No. 3,308,692 has a pair of handles and two pivot pins for positioning the serrated jaws to engage the work piece. The combination tool of U.S. Pat. No. 5,245,721 has two handles that rotate into two different positions to activate two different sets of jaws. Plier-type tools alone will not provide the necessary forces to disconnect the tubular conduit fitting previously discussed. The need exists for an improved tool to provide these necessary forces.

Accordingly, an object of the present invention is to provide a hand held tool to facilitate the maintenance and repair of automobile air conditioning systems. In particular, the tool is for disconnecting the tubular conduits having fittings at the joints where they are connected together.

Another object of the present invention is to provide a low cost disassembly tool that can be adapted to the different sizes of tubular conduits at different locations which are difficult to access in a vehicle.

Yet another object of the present invention is to provide a combination hand held tool that can disconnect tubular conduit fittings of a particular type with ease of effort and in a relatively short time period. The particular type being those used with the air conditioning and other sub-systems of vehicles.

SUMMARY OF THE INVENTION

The above objectives are accomplished according to the present invention by providing a combination tool to disassemble the conduit fitting type further defined herein. The low cost tool of this invention can greatly reduce the time to disassemble the fitting.

The combination tool is for disassembling a tubular conduit fitting for a fluid conduit line. The conduit fitting has a female connector and a male connector axially connected with each other. The male connector has a connector flange and a concentric retainer spring disposed within the flange. The tool comprises a first elongated handle having a first jaw and collar fixture and a second elongated handle having a second jaw and collar fixture. The first and second handles are pivotably connected to form pliers. The pliers have a first pivoted position in which the first and second jaws and collar fixtures engage the retainer spring to displace and release the retainer spring. The pliers also have a second pivoted position in which the first and second jaw and collar fixtures grip the female connector. A third elongated handle is pivotably attached to the first and second handles and has a flange retainer fixture for holding the connector flange when the pliers handles are in the first and second pivoted positions. The first, second and third handles are pivotably arranged in the combination tool so that the conduit fitting can be disassembled, by correlated pivotal movements of the handles after the spring is released, to cause the male and female connectors to axially separate.

The first jaw and collar fixture this invention further includes a first base portion, a first jaw portion and a first collar portion. The second jaw and collar fixture of this invention further includes a second base portion, a second jaw portion and a second collar portion. The first and second collar portions form a concentric collar used to displace and release the retainer spring inside the connector flange while the connector flange is being retained by the retainer fixture. The first and second jaw portions are forced together as pliers using the pair of handles to position the jaw portions to grip one of the pair of connector portions, being a female portion, while the connector flange is being again retained by the retainer flange.

In another embodiment of the invention a method is claimed for disassembling a tubular conduit fitting for a fluid conduit line using a combination tool. The conduit fitting has a male connector axially connected with a female connector. The male connector has a connector flange and a concentric retainer spring disposed within the flange to hold the female connector. A first step of the method comprises retaining the flange with a retainer fixture. A second step comprises urging a collar against the retainer spring to force the spring outwardly and separate the retainer spring from the female connector while the flange is retained in the retainer fixture. In a third step the female connector is gripped with a pair of movable jaw portions being pivotably linked with the retainer fixture while the retainer spring is released and held by the collars. A fourth step comprises urging the retainer fixture and jaws portions away from each other to facilitate separation of the male connector from the female connector in an axial direction.

BRIEF DESCRIPTION OF THE DRAWINGS

The construction designed to carry out the invention will hereinafter be described, together with other features thereof. The invention will be more readily understood from reading the following specification and by referencing the accompanying drawings which form a part thereof; wherein and example of the invention is shown and wherein:

FIG. 11 is a frontal elevation view of a retainer fixture of the combination tool of this invention;

FIG. 12 is a side elevation view of the retainer fixture of the combination tool of this invention consistent with the first position of the tool of FIG. 4;

FIG. 13 is a side elevation view of the retainer fixture of the combination tool of this invention consistent with the second position of the tool of FIG. 6;

FIG. 14A is an elevation view of a modified handle shaft of the combination tool of this invention having an end recess portion;

FIG. 14B is an elevation view of an extension handle shaft to use in combination with the modified handle shaft of FIG. 14A;

FIG. 15 is an elevation view of a telescoping handle shaft option for the combination tool of this invention.

DETAILED DESCRIPTION OF THE PREFERRED EMBODIMENTS

Figure 1A:
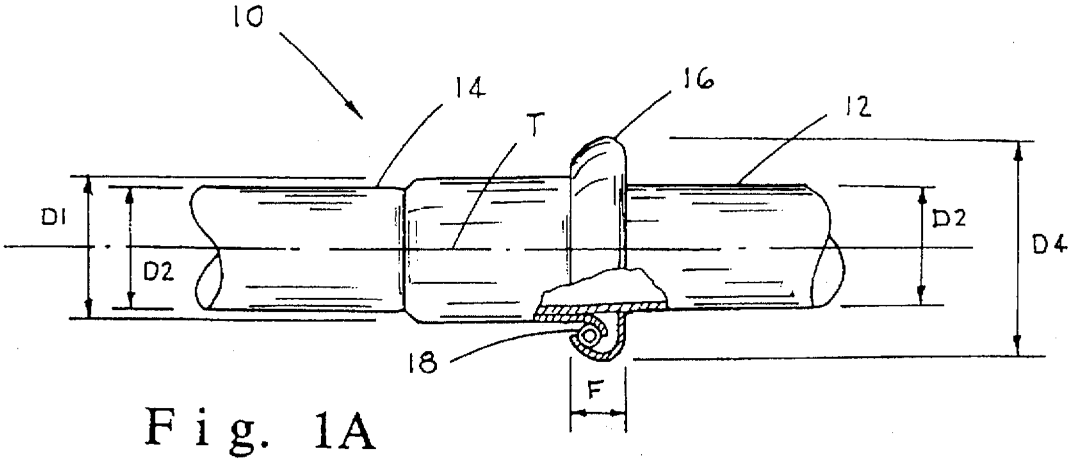
Fig. 1A PRIOR ART
FIG. 1A is an elevation view of the tubular conduit fitting of the prior art to be disconnected by the tool of this invention.
Figure 1B:
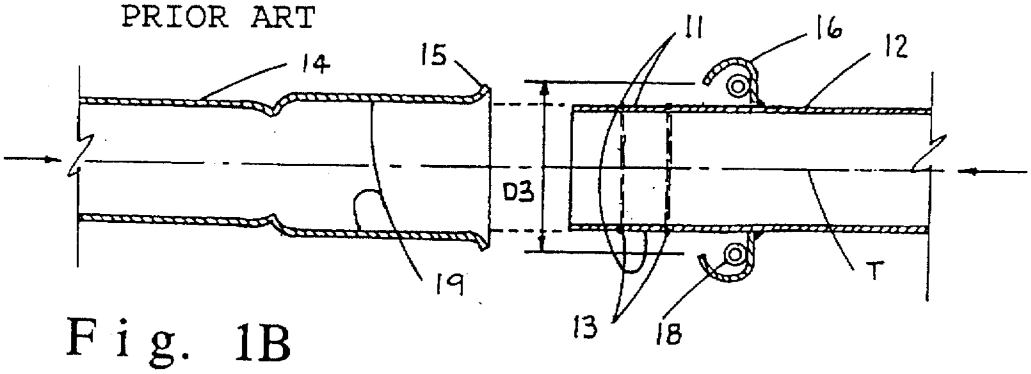
Fig. 1B PRIOR ART
FIG. 1B is a cross-sectional view of the prior art fitting of FIG. 1.

Referring now in more detail to the drawings, the invention will now be described in more detail. The combination tool of this invention is to be used to disconnect a particular tubular conduit fitting commonly used in the automotive industry. It is necessary to discuss the prior art fitting before components and functions of the combination tool of this invention can be described in detail. This conduit fitting was extensively used by the Ford Motor Company of Dearborn, Mich. for the air conditioning systems in automobiles during the 1980's. This tubular conduit fitting 10 is illustrated in FIGS. 1A and 1B and is symmetrical along its longitudinal axis T. A male connector portion 12 is made to fit inside a female connector portion 14. A flared end 15 of the female portion is forced into a connector flange 16 and is captured by a toroidal retainer spring 18 within the flange. The retainer spring is a normal spring with closely spaced helical windings that has been formed into a torodial shape by connecting its two ends together. The retainer spring is capable of having a change in its inside diameter when forces are applied to expand the spring.

As the conduit fitting 10 is assembled to be placed in service, the retainer spring 18 passes over the flared end 15 and holds it within the connector flange 16. To disassemble the fitting, this retainer spring must be forced back over the flared end 15 by forcing a tool inside the connector flange 16 through a flange opening 17 in the connector flange. The male connector portion 12 has flexible sealing rings 13 to help seal the joint from fluid escaping from within the tubular conduit. However, as time increases the rings become inflexible and the fluid leaks from the fitting. Chemicals within the fluids produce corrosion at the innerface between the inner surface 19 of the female connector portion 14 and the outer surface 11 of the male connector portion 12. The tubular conduit fitting after some time becomes frozen against disassembly due to this corrosion. The combination of forcing the retainer spring over the flared end 15 and forcing the joined connector portions 12 and 14 apart from each other at the same time is a task frequently not possible to achieve by hand.

Figure 2:
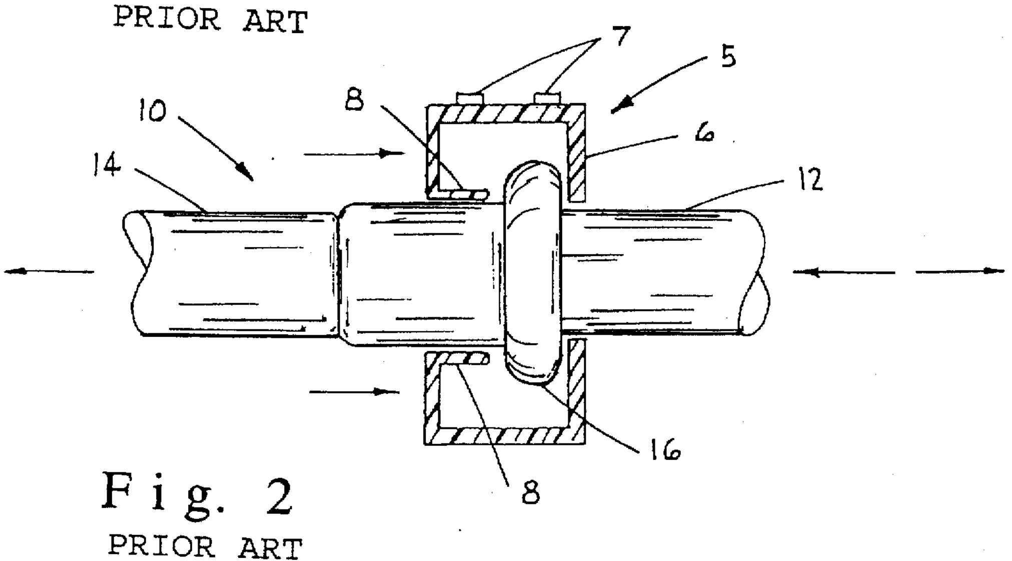
Fig. 2 PRIOR ART
FIG. 2 is a elevation view of the prior art fitting of FIG. 1 plus a disconnect fixture of the prior art shown in a cross-sectional view.

The disconnect fixture 5 illustrated in FIG. 2 is a tool used to force the retainer spring 18 over the flared end 15 during disassembly of the fitting 10. The disconnect fixture has a cylindrical housing 6 with fixture springs 7 that permit the disconnect fixture 5 to be placed around the connector flange 16 of the conduit fitting. A cylindrical disconnect collar 8 is positioned to be displaced into the flange opening 17 and push the retainer spring 18 over the flared end 15 when forces are applied, as shown by the inside set of arrows in FIG. 2. This position must be held to then provide forces to pull the two connector portions 12 and 14 apart, as shown by the outside set of arrows. Tubular conduit fittings are positioned at various locations within the engine compartment of the automobile. To provide all the necessary forces at the same time for disassembly of the fitting can be almost impossible. The combination tool 20 of this invention makes the task of disassembling the conduit fitting 10 achievable. The fittings A1, A2 and B of the combination tool 20 are made to be removable to account for the different sizes of tubular conduit fittings. A different set of fittings at the ends 23, 25 and 27 of the handle shafts 22, 24 and 26 respectively are require for each tubular conduit fitting 10 size.

Figure 3:
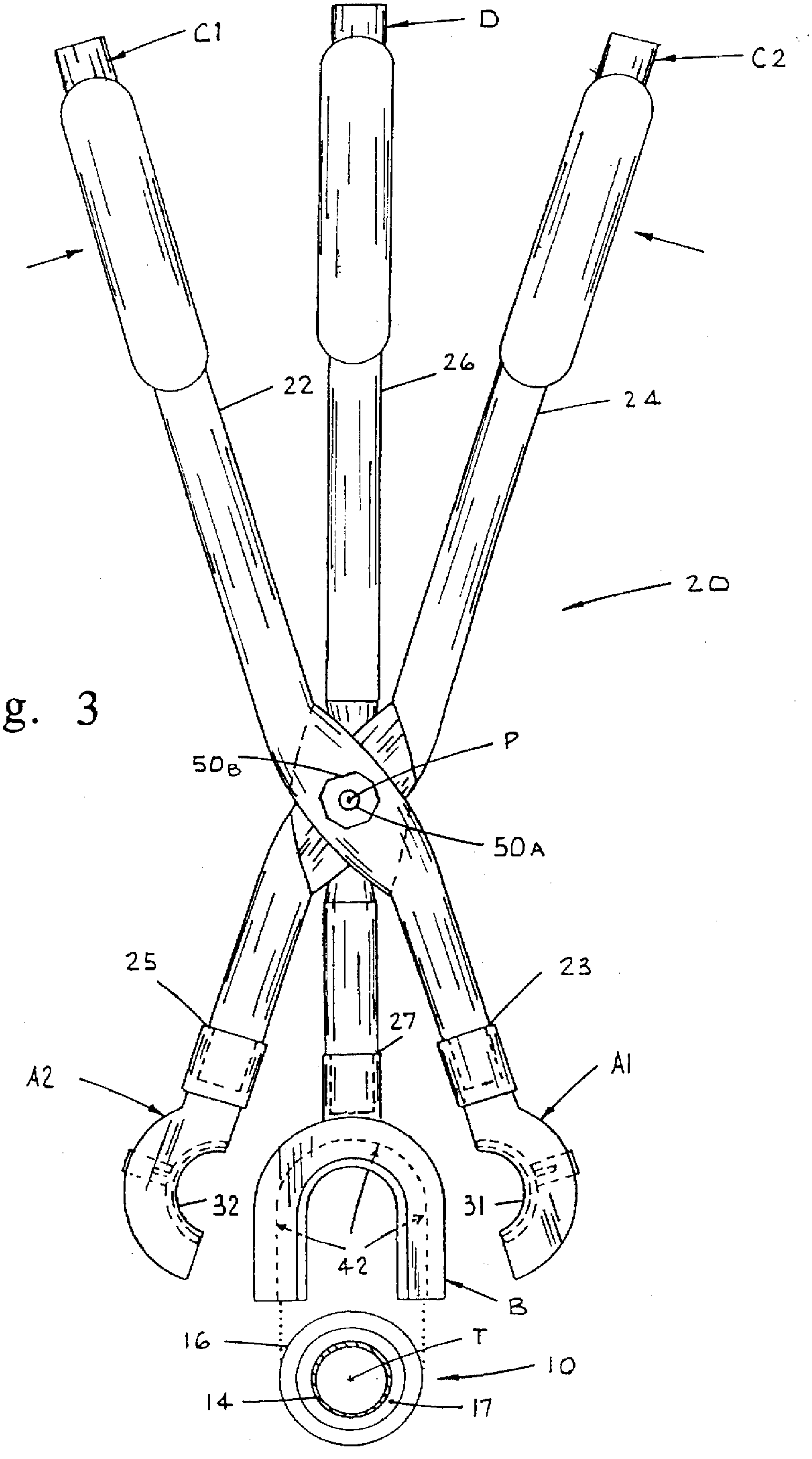
FIG. 3 is an frontal elevation view of a combination tool of this invention in an initial position to be placed on the prior art fitting of FIG. 1.

The principal components of the combination tool of this invention are shown in a front elevation view as illustrated in FIG. 3. A pair of handles C1 and C2 are attached by a first pivot pin 50*a* and pivot pin nut 50*b* to rotate independently about a first pivot axis P. A jaw and collar fixture A1 is attached to the lower end 23 of a left handle shaft 22 of the pair of handles and another jaw and collar fixture A2 is attached to the lower end 25 of a right handle shaft 24 of the pair of handles. The pair of handles C1,C2 being in a crossing relationship at the pivot axis P, along with their respective jaw and collar fixtures A1,A2, form a pliers like unit when the handle shafts 22,24 are displaced toward each other in direction shown by the arrows. A third handle D is also attached to the pair of handles and can also independently rotate about the pivot axis P. A flange retainer fixture B is attached to the lower end 27 of the third handle shaft 26 of the third handle D. The third handle shaft can also rotate about another pivot axis S perpendicular to the pivot axis P to move the flange retainer fixture B closer to or away from a plane containing the jaw and collar fixtures A1,A2. The various movements of the three handles can be positioned and sequenced to provide the necessary forces, functions and operations to disassemble the tubular conduit fitting 10. Other uses and operations of the tool are also possible with this combination tool within the scope of this invention.

The combination tool 20 of this invention is initially positioned such that its elongated handles are approximately perpendicular to the longitudinal axis T of the tubular conduit at the conduit fitting as illustrated in FIG. 3. The first movement of the combination tool is made to position the retainer fitting B to partially encircle and retain the connector flange 16 of the conduit fitting 10. A flange retainer cutout 42 is provided to partially encircle the connector flange. The jaw and collar fittings A1,A2 are now in a position to be placed adjacent to the female connector portion 14 of the conduit fitting by moving the pair of handles C1,C2 in a direction indicated by the arrows. The position of the jaw and collar fittings along the axis T is such that these fittings do not contact the connector flange 16. The jaw surfaces 31,32 of the jaw and collar fittings are made to touch the female connector portion 14 but not to provide a gripping force with this initial positioning of the pair of handles of the combination tool.

Figure 4:
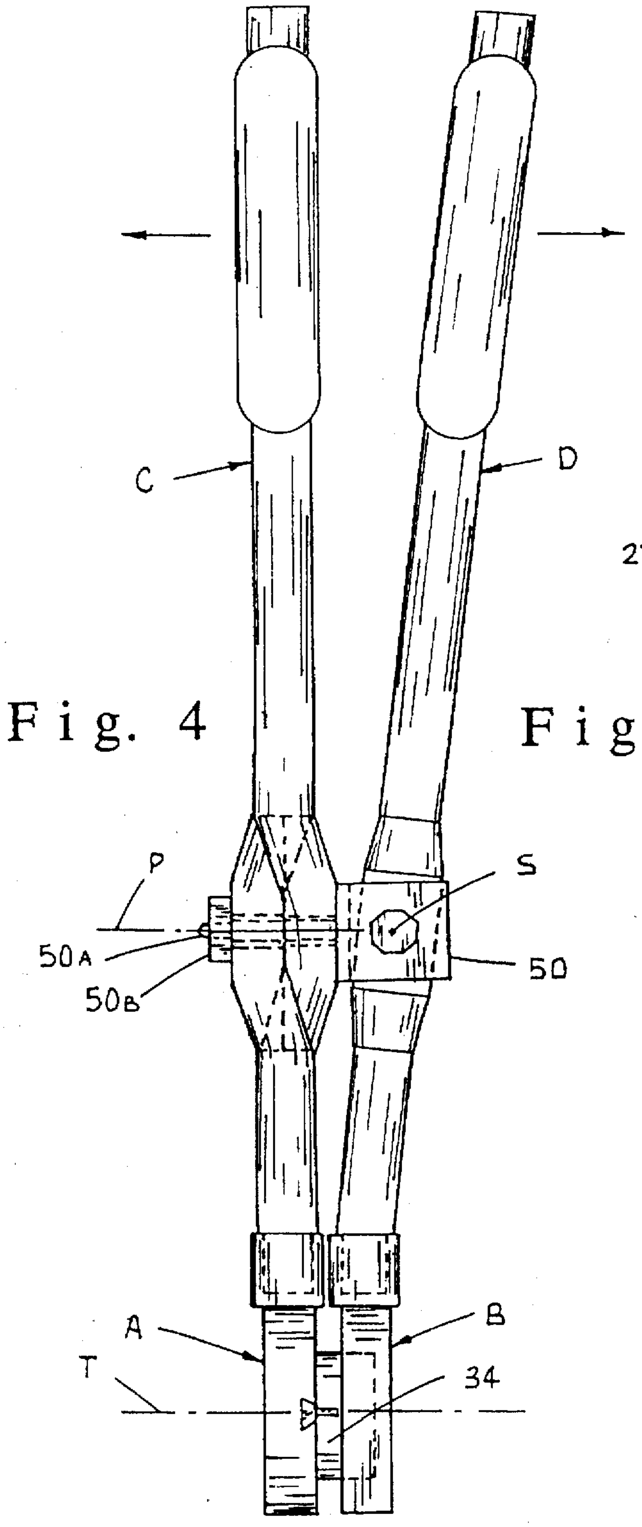
FIG. 4 is a side elevation view of the combination tool of this invention in a first position where a first functional operation can be realized.
Figure 5:
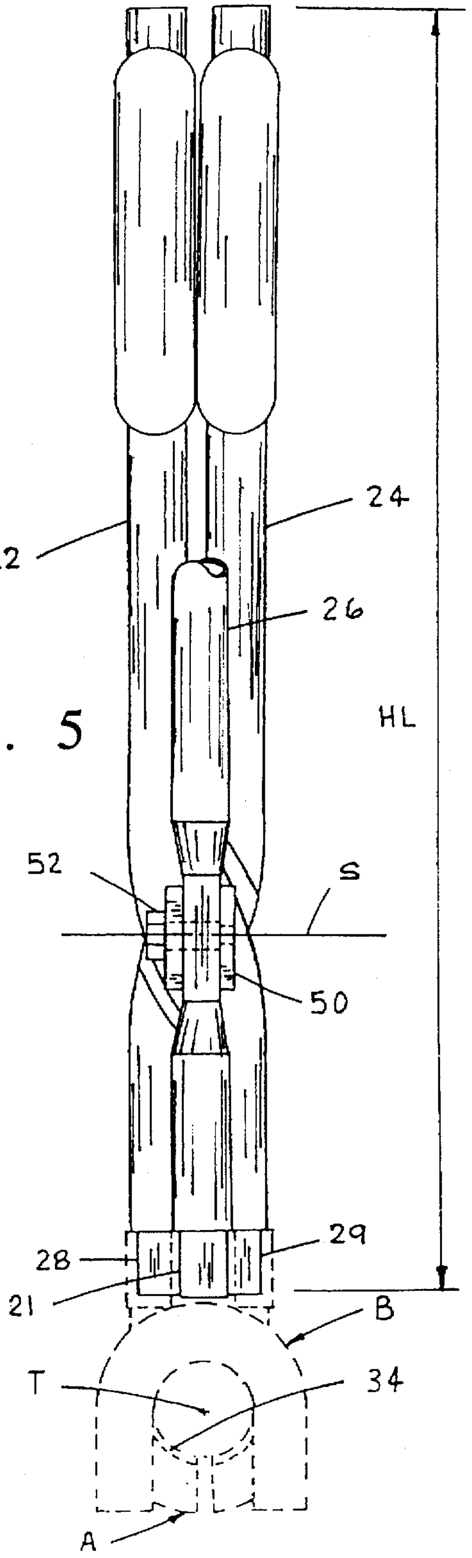
FIG. 5 is a rear elevation view of the combination tool of this invention in the same first position as that of FIG. 4.
Figure 6:
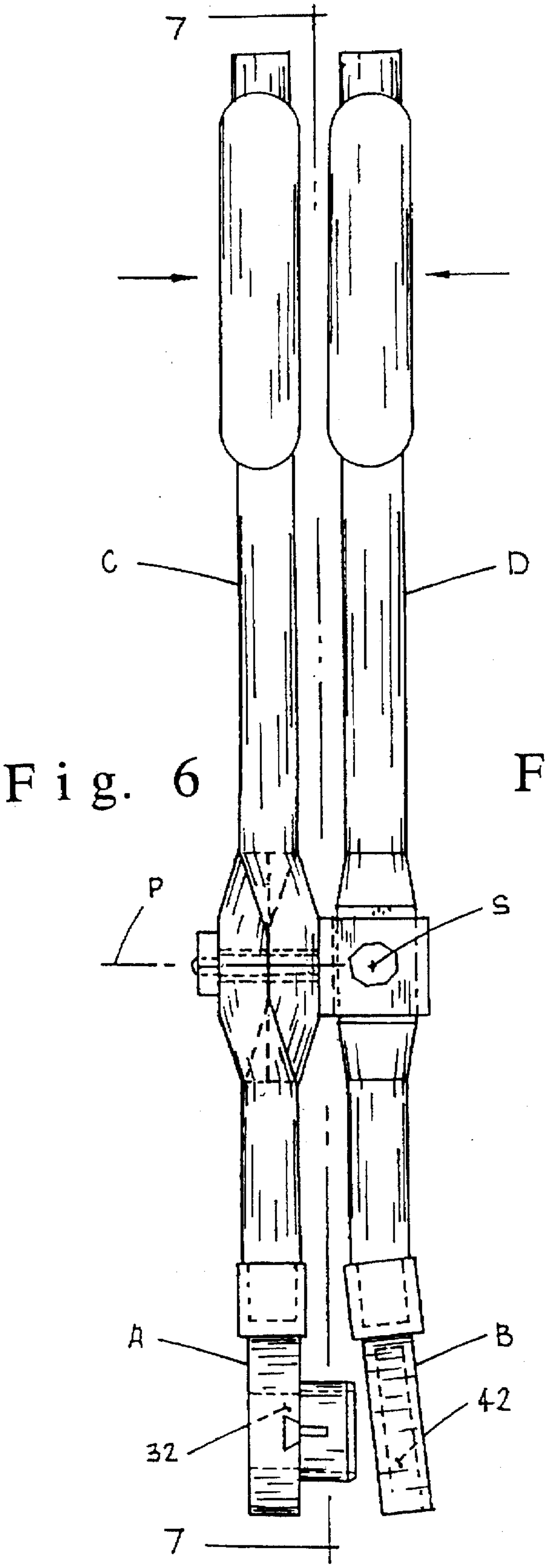
FIG. 6 is a side elevation view of the combination tool of this invention in a second position after a second functional operation has been realized.
Figure 16:
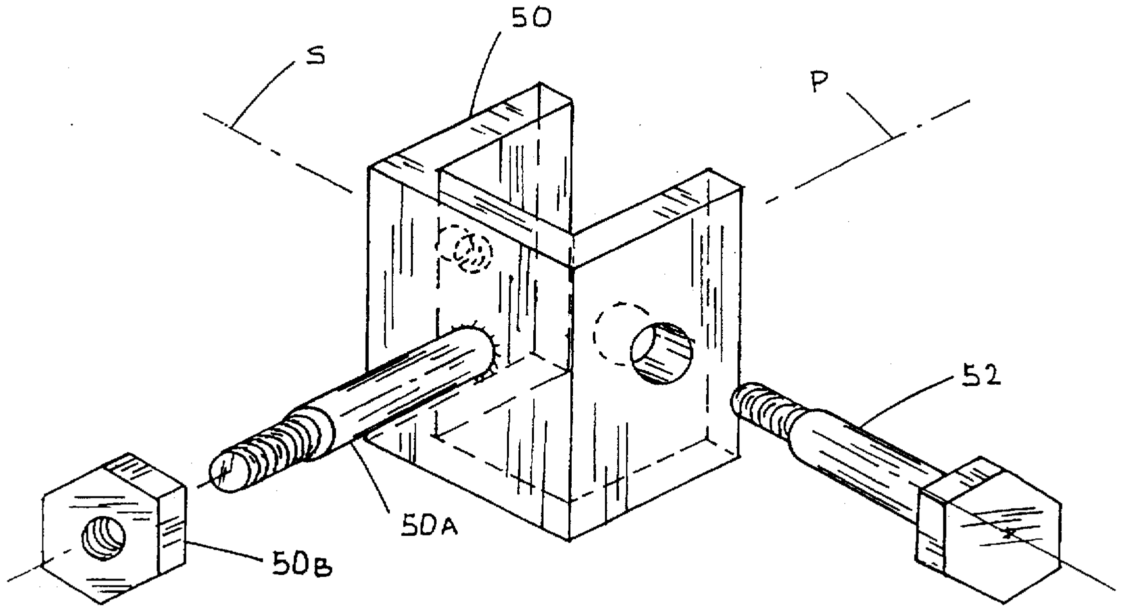
FIG. 16 is a perspective view of the pivot bracket and pivot pins for the combination tool of this invention.

A first operating position of the combined tool 20 is illustrated in the views of FIGS. 4 and 5. The starting position of the combined tool is the initial position described previously with the flange retaining fixture B around the connector flange 16 and the jaw and collar fittings A touching the female connector portion 14. The pair of handles C are aligned with one another and the third handle D is pivotally attached to the pair of handles by a pivot bracket 50. The pivot pin 50*a* is rigidly attached to the pivot bracket. The pair of handles C, are held in alignment by the pivot nut 50*b* and, are free to rotate as pliers about pivot axis P. The third handle D along with the pivot bracket 50 are also free to rotate about pivot axis P. In addition, the third handle is free to rotate about another pivot axis S. Details of the pivot bracket 50 showing both pivot axes P and S is illustrated in FIG. 16. In this first operating position the pair of handles C are moved to approach the third handle D as shown by the arrows (FIG. 6). This movement brings the collar portions 34 of the jaw and collar fittings to displace the retainer spring 18 within the connector flange 16 (FIG. 1). When the first operating position has been achieved, the collar portions 34 have released the retainer spring 18 so that the flared end 15 of the female connector portion 14 will not make contact with the spring when the male and female connector portions are forced apart.

A rear elevation view of the combined tool in its first operating position is illustrated in FIG. 5. End extensions 21, 28 and 29 of the handle shafts 26, 22 and 24 respectively are provided for attachment of the flange retainer fixture B and the jaw and collar fixtures A1 and A2. The fixtures are shown as dashed lines in this drawing for clarity. When the third handle shaft 26 is rotated about the other pivot axis S, by moving it away from the pair of handle shafts 22,24, as illustrated by the arrows of FIG. 4, the first operating position is achieved. The third handle shaft is rotatably attached to the pivot bracket 50 by a second pivot pin 52 having a standard head and a threaded shaft (FIG. 16). The overall handle length HL of each handle shaft is preferably about 12 inches.

Figure 7:
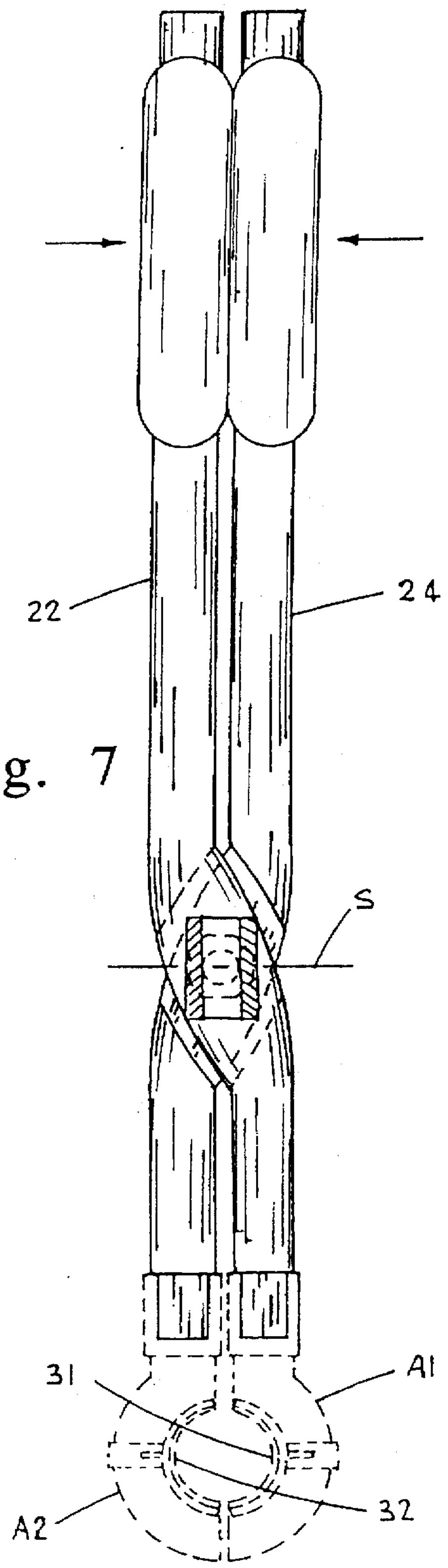
FIG. 7 is a rear elevation view of the combination tool of the invention in the same second position as that of FIG. 6 and cut along line 7—7 in FIG. 6.

A second operating position of the combined tool 20 of this invention is shown by a side elevation view as illustrated in FIG. 6. A rear elevation view of the second operating position is taken along sectional line 7—7 of FIG. 6 as illustrated in FIG. 7. The second operating position is achieved by movements of the three handle shafts starting with the conditions of the first operating position described above. The pair of handles C are forced together as show by the arrows in FIG. 7. This action will cause the jaws 31 and 32 of the jaw and collar fixtures A1 and A2 respectively to grip and hold the female connector portion 14 of the conduit fitting (FIG. 1). After this gripping action is applied, the pair of handles C are moved to approach the third handle D as illustrated in FIG. 6. The toroidal retainer spring 18 is relieved of its retaining function prior to this movement being initiated. This movement to obtain the second position shown will result when forces from the combined tool are large enough to break the interfacial forces within the conduit fitting 10 at the innerface between the female connector portion and the male connector portion. The flange retainer fixture B pushes on the connector flange 16 of the conduit fitting and the jaws of the jaw and collar fixtures A push in an opposite direction on the female connector portion 14 to force the two connector portions to break loose and be displaced relative to each other. A relatively small movement between connector portions 12 and 14 is sufficient to make these interfacial forces become much smaller and the conduit fitting easier to disassemble. The mechanic can repeatedly relax the gripping action of the jaws, move the handles apart, reapply the gripping action and move the handles back together to work the two connector portions apart. The structural and functional features of the retainer fixture and the two jaw and collar fixtures are critical to the disassembly operation and are discussed in more detail below.

Figure 8:
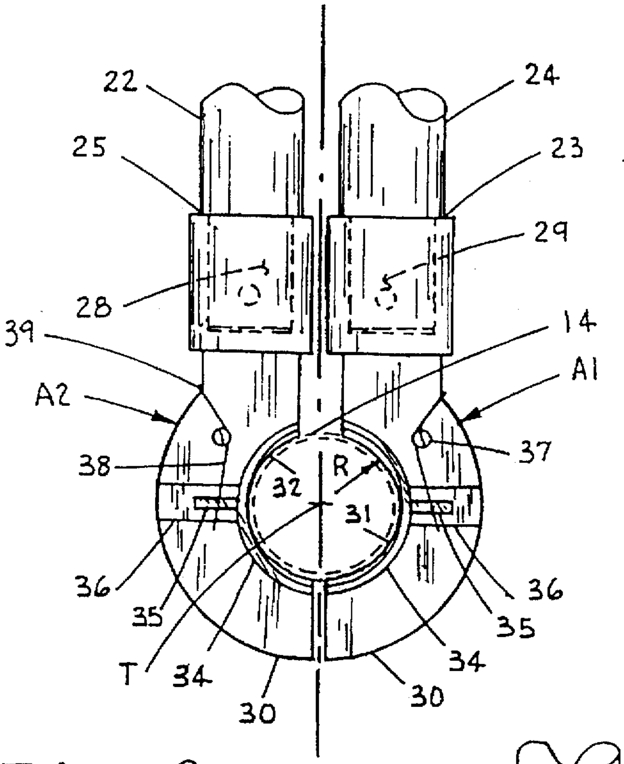
FIG. 8 is a rear elevation view of a collar and jaw fixture of the combination tool of this invention consistent with the second position of the tool of FIG. 6.
Figure 9:
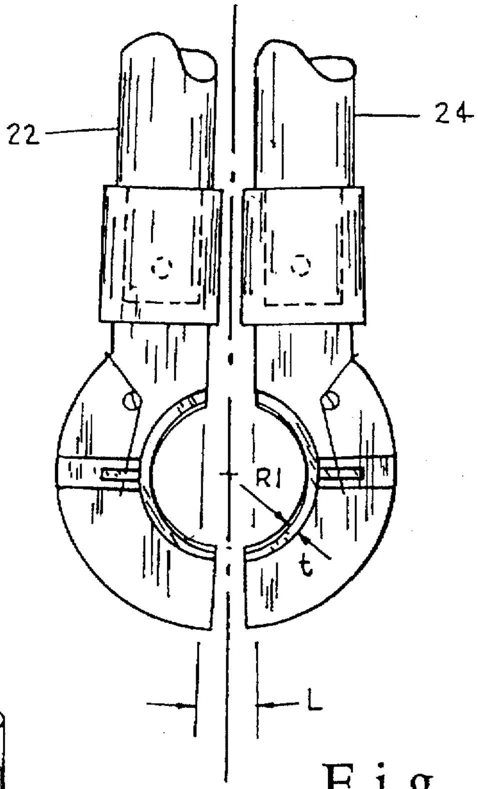
FIG. 9 is a rear elevation view of the collar and jaw fixture of the combination tool of this invention consistent with the first position of the tool of FIG. 4.
Figure 10:
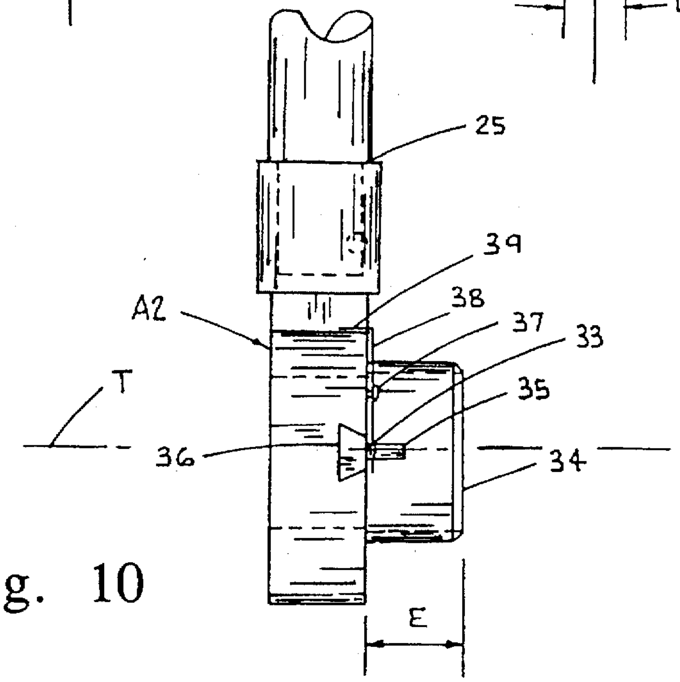
FIG. 10 is a side elevation view of a collar and jaw fixture of the combination tool of this invention.

The two jaw and collar fixtures A1,A2 of the combined tool 10 are shown in detail in the illustrations of FIGS. 8, 9 and 10. These fittings attach to remote end connectors the lower ends 23 and 25 of the handle shafts 22 and 24 respectively and preferably slip fit on the end extensions 28 and 29 of the handle shafts. The fittings are easily removed and replaced by the same type fittings A of a different size, as required. Each collar 34 is formed with a sliding wedge 36 and reinforced with a collar support member 35 for added strength to provide an adjustable mount. The mounting of the wedges within the base portions 30 makes the collars adjustable radially in and out of the base portion with respect to the tubular connector fitting 10. The sliding wedges 36 have a sliding relationship with each base portion 30 so that the collars 34 can move relative to each base portion 30 to maintain symmetry with respect to the longitudinal fitting axis T. An adjustment spring 38 is used to position the collar portion in its proper location as illustrated in FIG. 8. The adjustment spring is held in place on the base portion 30 by a spring attachment 37 and a spring extension portion 39 keeps the adjustment spring from being displaced from the base portion (FIG 10). The other end of the adjustment spring extends through an opening 33 in the collar support member portion 35.

The handle shafts 22,24 are moved apart an angular distance L to provide a small displacement between the split jaw and collar arrangement as illustrated in FIG. 9. This is necessary to relieve the gripping action of jaws 31 and 32 consistent with the first position of the combination tool as discussed previously. In this angular position the two collar portions 34 form a cylindrical shape with an internal diameter of twice the collar radius R1. This diameter should be greater than the female connector portion diameter D1. The outside diameter of the two collar portions 34 is twice the collar radius R1 plus twice the collar thickness t, or 2×(R1+t). This diameter must be somewhat less than the diameter D3 of connector flange opening 17. The collar extension length E is sufficient to force the retainer spring 18 from the flared end 15 of the female connector portion 14 (FIG. 1).

The handle shafts 22 and 24 are move together so that the jaws 31 and 32 can grip the female connector portion 14 of the conduit fitting as illustrated in FIG. 8. This relative position of the two jaw and collar fittings consistent with the second position of the combined tool 20 as discussed previously. The closed jaws form a diameter twice the jaw radius R, or 2×R. This diameter should be slightly less than the outside diameter D1 of the female connector portion 14 to provide sufficient gripping action.

The retainer fixture B of the combination tool 20 is illustrated in FIGS. 11, 12 and 13. The retainer fixture attaches to remote end connectors at the end 27 of the third handle shaft 26. The end connector is preferably an end extension portion 21. The retainer fixture is shaped like a horseshoe due to the cutouts in the flange base 40 of the fixture. The retainer cutout portion 42 has a radius R3 which gives a diameter 2×R3 slightly greater than the diameter D4 of the connector flange 16 of the conduit fitting 10 (see FIG. 1). The cutout portion allows the retainer fixture to partially encircle the connector flange 16 of the conduit fitting 10 to provide restraint of this connector flange during disassembly of the fitting. The width F1 of the cutout portion 42 is also greater than the width F of the connector flange 16. The front portion 44 as well as the rear portion 46 of the retainer fixture base portion 40 of the retainer fixture B also have cutouts to allow the fixture to fit over the two connector portions 12 and 14 of the conduit fitting 10. The diameter 2×R4 of the cutout of the front portion 44 is made slightly larger than the diameter D1 of the female connector portion 14 of the conduit fitting. The diameter 2×R2 of the cutout of the rear portion 46 is also made slightly larger than the diameter D2 of the male connector portion 12 of the conduit fitting. The connector flange 16 of the conduit fitting 10 remains encircled by the retainer fixture B for all positions of the combination tool 20 during disassembly of the fitting.

The retainer fixture B makes a slight angle M with respect to the third handle shaft 26 as illustrated in FIG. 12. This angle allows the meshing of the jaw and collar fixtures A with the retainer fixture B when in the first operating position illustrated in FIG. 4. As the retainer fixture moves away from the jaw and collar fixtures, during repositioning of the handles of the combination tool, the retainer fixture assumes the position illustrated in FIG. 13, while the jaw and collar fixtures remain in their initial orientation, as illustrated in FIG. 6. Sufficient dimensional tolerances are provided in the fixtures to allow this relative angular relationship to exist. These tolerances are easily determined by those skilled in the art.

Extensions for the handle shafts 22, 24 and 26 are provided as an embodiment for improving the functional features of this invention as illustrated in FIGS. 14A, 14B and 15. A modified handle shaft end 60 is preferably provided with a handle recess 62 in the outer end of this modified handle shaft to replace each of the previously used handle shafts 22, 24 and 26. An extension handle shaft 62, being similar to the modified handle shaft, preferably has an extension handle end portion 66 designed to fit into the handle recess 62 of each modified handle shaft. The effect of these extensions is to allow the mechanic to increase the forces applied in disassembling the conduit fitting 10.

In a second embodiment of the handle extension improvement a telescoping handle shaft H is provided to replace the outer portion of each of the handle shafts 22, 24 and 26. A tubular handle shaft 70 is provided for each telescoping handle shaft having a tubular handle bore 72. A rod handle shaft 74 fits into the bore of the tubular handle shaft and is held in place by a release button 76 in the rod handle shaft. A plurality of apertures 78 in the tubular handle shaft allows the rod handle shaft to be positioned at various extension locations. The advantage of this telescoping handle shaft H is that it allows different mechanical advantages to be exerted by the mechanic depending on the overall length of the extended handles.

The combination tool 20 can be made of any material of sufficient strength to exert the forces required without failure. The preferred material is a steel material. The jaws of the jaw and collar fixture are preferably of a high strength steel. The collar of the jaw and collar fixture are preferably of a high strength plastic material. Rubber or plastic grips can be provided on each handle shaft. The handle shafts can be of any shape suitable for strength and weight requirements, including circular of square.

The use of this combination tool 20 has definite advantages over the disconnect fixture 5 of the art. The anticipated time to disassemble a conduit fitting has been reduced to less than five minutes. This compares to sixty minutes or more with the prior art device. The cost of this combination tool can be recovered after only a few conduit fittings have been disassembled.

While the preferred embodiments of the invention have been described using specific terms, such description is for illustrative purposes only and it is to be understood that changes and variations may be made without departing from the spirit or scope of the following claims.

What is claimed is:

1. A combination tool for disassembly of a tubular conduit fitting for a fluid conduit line, said conduit fitting having a female connector and a male connector axially connected with each other, said male connector having a connector flange and a concentric retainer spring disposed within said flange, said tool comprising:

a first elongated handle having a first jaw and collar fixture and a second elongated handle having a second jaw and collar fixture;

said first and second handles being pivotally connected to form pliers;

a third elongated handle pivotally attached to said first and second handles having a flange retainer fixture for holding said connector flange during said disassembly;

said pliers and said third elongated handle having a first operating position prior to which a collar portion of said first and second jaw and collar fixtures engages said retainer spring to displace and release said retainer spring and a second operating position prior to which a jaw portion of said first and second jaw and collar fixtures grips said female connector; and said first, second and third handles being pivotally arranged with respect to each other in said combination tool so that said conduit fitting can be disassembled by correlated pivotal movements of said handles after said spring is released to cause said male and female connectors to axially separate when said second operating position is achieved.

2. The combination tool set forth in claim 1, wherein:

said first jaw and collar fixture includes a first base portion attached to said first handle, said first base portion having a first jaw portion and a first collar portion;

said second jaw and collar fixture includes a second base portion attached to said second handle, said second base portion having a second jaw portion and a second collar portion;

said first and second collar portions forming a concentric collar that displaces and releases said retainer spring inside said connector flange; and said first and second handles being pivoted away from said third handle in said first pivoted position of said combination tool to engage said concentric collar and retainer spring.

3. The combination tool set forth in claim 2, wherein:

said first and second jaw portions comprise a pair of concentric jaw portions which grip said female connector; and said first and second jaw portions being urged together when said first and second handles are in said second pivoted position and said third handle is pivoted towards said first and second handles to cause said male and female connections to separate while being gripped by said jaw portions and retained by said retainer fixture.

4. The combination tool set forth in claim 3, including an adjustable mount carried by said base portion for slidably mounting said first and second collar portions relative to said first and second base portions respectively to allow said concentric collar to be forced into said connector flange so that said collar engages said retainer spring to allow said first pivoted position and further to allow said collar to be radially displace when said first and second base portions are moved so that said jaws grip said female connector to allow said second pivoted position.

5. The combination tool set forth in claim 4, wherein said adjustable mount comprises:

a sliding wedge which slides relative to said base portion;

a collar support member extending between said collar portion and said sliding wedge to reinforce said collar portion; and an adjustment spring supported by said base portion and attached to said collar support member to position said concentric collar at a predetermined location.

6. The combination tool set forth in claim 1, wherein:

said first and second jaw and collar fixtures are carried by remote end connectors of said first and second handles respectively;

said flange retainer fixture is carried by another remote end connector of said third handle; and said first and second jaw and collar fixtures and said retainer fixture can be removed and replaced by three other fixtures of identical design to accommodate conduit fittings of various sizes.

7. The combination tool set forth in claim 1, wherein said first, second and third handles each have a modified handle shaft end to receive an extension handle shaft which can help increase the forces used to disassemble said conduit fitting by the combination tool.

8. The combination tool set forth in claim 1, wherein said first, second and third handles each have a tubular handle shaft having a tubular handle bore to receive a rod handle shaft, said rod handle shaft having a release button that extends into one of a plurality of apertures in said tubular handle shaft to position said rod handle shaft axially from said tubular handle shaft.

9. A combination tool for disassembly of a tubular conduit fitting, said fitting having a female connector and a male connector axially connected with each other, said male connector having a connector flange containing a retainer spring, said tool comprising:

a pliers having first and second handles pivotally connected at a first pivot axis including a first jaw and collar fixture and a second jaw and collar fixture carried on end connectors of said handles;

a split collar and jaw arrangement including a collar portion carried on each jaw and collar fixture for engaging and releasing said retainer spring when a first operating position is achieved by said tool;

a jaw portions included in each jaw and collar fixture for engaging said female connector to achieve a second operating position of said tool;

a third handle pivotally connected to at a pivot bracket carried by said pliers, said third handle including a flange retainer fixture carried by an end connector of said third handle for engaging said connector flange and holding said flange to help achieve said first and second operating positions; and a second pivot carried by said pivot bracket perpendicular to said first pivot for pivotally connecting said third handle to said pivot bracket so that said third handle rotates about said second pivot axis perpendicular to said first pivot axis, wherein said conduit fitting can be disassembled by positioning said handles relative to one another such that said female and said male connectors are unrestrained and axially displaced from one another.

* * * * *